(12) United States Patent
Nieberlein et al.

(10) Patent No.: US 9,379,603 B2
(45) Date of Patent: Jun. 28, 2016

(54) ELECTRICAL SUPPLY APPARATUS WITH CURRENT WAVEFORM SIGNAL AND METHOD FOR OPERATING THE ELECTRICAL SUPPLY APPARATUS

(75) Inventors: Uwe Nieberlein, Roth (DE); Jens Jordan, Nuremberg (DE); Guenther Koeninger, Neuhof (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 201 days.

(21) Appl. No.: 14/236,713

(22) PCT Filed: Jul. 31, 2012

(86) PCT No.: PCT/EP2012/003235
§ 371 (c)(1),
(2), (4) Date: Feb. 21, 2014

(87) PCT Pub. No.: WO2013/017253
PCT Pub. Date: Feb. 7, 2013

(65) Prior Publication Data
US 2014/0185342 A1 Jul. 3, 2014

(30) Foreign Application Priority Data
Aug. 3, 2011 (DE) .......................... 10 2011 109 333

(51) Int. Cl.
*H02M 7/217* (2006.01)
*H02M 1/42* (2007.01)
*H02J 3/18* (2006.01)
*H02M 1/00* (2006.01)

(52) U.S. Cl.
CPC .............. *H02M 1/42* (2013.01); *H02M 1/4208* (2013.01); *H02J 3/1835* (2013.01); *H02M 2001/0003* (2013.01); *Y02B 70/126* (2013.01); *Y02E 40/30* (2013.01)

(58) Field of Classification Search
CPC ................ H02M 1/42; H02M 1/4208; H02M 2001/0003; H02M 7/217; Y02B 70/126; H02J 3/18; H02J 3/1835
USPC .................. 363/73, 81, 84–88, 108, 125, 132
See application file for complete search history.

(56) References Cited

U.S. PATENT DOCUMENTS

| | | | | |
|---|---|---|---|---|
| 3,529,144 A | * | 9/1970 | Laetsch, Jr. | G06G 7/64 327/100 |
| 4,755,738 A | * | 7/1988 | Shimamura | H02J 3/1864 318/438 |
| 6,140,777 A | * | 10/2000 | Wang | H02M 1/4225 315/224 |
| 6,178,101 B1 | | 1/2001 | Shires | |
| 2006/0158912 A1 | | 7/2006 | Wu et al. | |

FOREIGN PATENT DOCUMENTS

EP   0 784 372 A2   7/1997
WO   WO 00/07414 A1   2/2000

OTHER PUBLICATIONS

Louganski, K. P. et al., Active Compensation of the Input Filter Capacitor Current in Single-Phase PFC Boost Converters, Computers in Power Electronics, (Jul. 1, 2006), pp. 282-288.
Wu, S. et al., Boost PFC converter with a new sinusoidal reference current algorithm, Communications, Circuts and Systems, (Jul. 23, 2009), pp. 711-715.
International Search Report dated Aug. 6, 2013 issued in PCT/EP2012/003235.

* cited by examiner

*Primary Examiner* — Yemane Mehari
(74) *Attorney, Agent, or Firm* — Scully Scott Murphy and Presser

(57) ABSTRACT

An electrical supply apparatus is provided. The apparatus has an input for connecting the electrical supply apparatus to a power supply system, an output for connecting the electrical supply apparatus to a load, a rectifier for rectifying the input voltage into a rectified input voltage, and a PFC module for smoothing the rectified input voltage. The PFC module also has an active power factor correction device for shaping a time-dependent supply current, such that a time-dependent input current into the PFC module is matched to a time-dependent current waveform signal. A control module is provided for generating the current waveform signal. The control module generates the current waveform signal during the operation of the electrical supply apparatus independently of the input voltage and temporally synchronizes the current waveform signal with the input voltage or a derivative of the input voltage.

14 Claims, 5 Drawing Sheets

ELECTRICAL SUPPLY APPARATUS WITH CURRENT WAVEFORM SIGNAL AND METHOD FOR OPERATING THE ELECTRICAL SUPPLY APPARATUS

The invention relates to an electrical supply apparatus comprising an input for connecting the electrical supply apparatus to a power supply system which provides an AC voltage as input voltage, comprising an output for connecting the electrical supply apparatus to a load, wherein the output provides a DC voltage as output voltage, comprising a rectifier, which rectifies the input voltage into a rectified input voltage, comprising a PFC module, which comprises a smoothing device for smoothing the rectified input voltage and an active power factor correction device, wherein the power factor correction device is designed to shape, in a manner depending on a time-dependent current waveform signal, a time-dependent supply current for the smoothing device in such a way that the time-dependent input current into the PFC module is matched to the current waveform signal, and comprising a control module, which generates the current waveform signal for the PFC module, in particular for the power correction device. The invention also relates to a method for operating the electrical supply apparatus.

For supplying electrical loads from a supply system, use is usually made of power supply units which, in many embodiments, generate a DC voltage for the load from an AC voltage as system voltage from the supply system.

However, in the case of sinusoidal system voltages of the supply system and nonlinear loads, phase-shifted and non-sinusoidal system currents occur, which can cause disturbances in the supply system. In this situation, in the supply system the instantaneous value of the system current is not proportional to the instantaneous value of the system voltage. While the sinusoidal system voltage as an impressed variable remains sinusoidal, the system current of the supply system can be temporally shifted or altered in terms of its shape. This has the effect that the so-called power factor, which denotes the ratio of absolute value of the active power P to the absolute value of an apparent power S, deviates from its ideal value 1.

Power factor correction modules, with power factor correction or power factor compensation, abbreviated to PFC, are usually used for improving the power factor. Said power factor correction modules have the task of compensating for the nonlinear current consumption of loads and, in the case of active power factor correction, simultaneously achieving compensation of the reactive power by matching the phase angle of the system current to the phase angle of the system voltage.

The document DE 10 2006 044 879 A1, which probably forms the closest prior art, describes a power supply apparatus comprising a control unit which is provided for matching a current profile to a voltage profile. The matching is achieved by at least one active unit with at least one switchable unit.

The object of the present invention is to provide an electrical supply apparatus which keeps the loading of the supply system low. Further subject matter of the invention is to propose a method for operating the electrical supply apparatus.

These objects are achieved by means of an electrical supply apparatus comprising the features of claim 1 and by means of a method comprising the features of claim 14. Preferred or advantageous embodiments of the invention are evident from the dependent claims, the following description and the accompanying figures.

The invention thus relates to an electrical supply apparatus, which is designed, in particular, as a power supply unit. The power supply unit can be designed e.g. for operation in an aircraft for supplying lighting devices, such as cabin lighting systems, for example. In this exemplary configuration, the electrical supply apparatus has an output power of greater than 5 watts, preferably greater than 10 watts, and in particular greater than 15 watts, and/or less than 500 watts, preferably less than 300 watts, and in particular less than 200 watts.

The electrical supply apparatus comprises an input for connecting the electrical supply apparatus to a power supply system. In the case of a power supply unit for an aircraft, the power supply system can have, for example, a root-mean-square voltage of 115 volts and a system frequency of 400 hertz to 800 hertz. In general, the power supply system provides an AC voltage as input voltage $U_{in}$.

The electrical supply apparatus comprises an output for connecting the electrical supply apparatus to a load, wherein the output provides a DC voltage as output voltage $U_{out}$. In the example as a power supply unit for an aircraft, the load can be designed as one or a plurality of lighting devices, in particular LED devices. The output voltage $U_{out}$ lie for example between 200 volts and 250 volts.

The electrical supply apparatus comprises a rectifier, which rectifies the input voltage $U_{in}$ into a rectified input voltage $U_{pfc}$. Rectifiers of this type are sufficiently known; in particular, the rectifier can be a bridge rectifier.

Furthermore, a preferably single-phase PFC module is provided, which comprises firstly a smoothing device for smoothing the rectified input voltage $U_{pfc}$ and secondly an active power factor correction device.

The smoothing device can be designed as a storage capacitor, for example, at which the output voltage $U_{out}$ can be tapped off.

The power factor correction device is designed to shape, in a manner depending on a time-dependent current waveform signal, a time-dependent supply current for the smoothing device in such a way that a time-dependent input current $I_{pfc}$ into the PFC module is matched to the current waveform signal. The supply current for the smoothing device will often have a jagged, stepped or otherwise deformed profile. By contrast, the time-dependent input current $I_{pfc}$ has a curve profile matched to the curve profile of the current waveform signal. Consequently, as a result the time-dependent input current $I_{pfc}$ is matched to the time-dependent input voltage $U_{in}$ or rectified input voltage $U_{pfc}$ by means of the power factor correction device.

The electrical supply apparatus furthermore comprises a control module, which generates the current waveform signal for the PFC module, in particular for the power factor correction device.

In the context of the invention it is proposed that the control module generates the curve shape of the current waveform signal during the operation of the electrical supply apparatus independently of the input voltage $U_{in}$ or the rectified input voltage $U_{pfc}$ and temporally synchronizes the current waveform signal with the input voltage $U_{in}$ or a derivative of the input voltage, in particular the rectified input voltage $U_{pfc}$. To put it another way, during the operation of the electrical supply apparatus, the curve shape of the current waveform signal is generated artificially, to be precise independently of real voltage profiles.

The advantage of the invention can be seen in the fact that as a result of the artificial generation of the current waveform signal, the latter does not constitute an instantaneous reaction of instantaneous values of the voltage profiles, but rather can be fashioned artificially such that the operating properties of the power supply unit can be improved. In this regard, it has been established, for example, that in customary power supply units with power factor corrections, precisely the rear part of a half-cycle of the time-dependent input current is greatly deformed. This deformation of the falling edge of the half-cycle of the input current inevitably leads to a deformation of the entire curve profile and, as a result, inter alia to a reduction of the power factor.

By contrast, the artificially fashioned curve shape ensures that the current waveform signal can be designed such that the power factor can be realized with a constantly high magnitude and the curve profile of the input current can be realized with few harmonics. Further advantages arise from the fact that in special operating states the curve shape can likewise be fashioned independently of the instantaneous values of the voltage that are really present.

In order, however, to be able to produce a matching of the input current Ipfc to the input voltage Uin or the rectified input voltage Upfc, the current waveform signal is synchronized with one of said voltages and, if appropriate, adapted in terms of temporal length. In this way, it is possible, in the case of a change in the frequency of the input voltage Uin, correspondingly to stretch or compress the current waveform signal and thereby to achieve the synchronization. The zero crossings of the voltage curves are preferably used as a synchronization instant, but other synchronization points can also be used in modified embodiments.

In one preferred embodiment of the invention, the current waveform signal is subdivided into half-cycles, wherein the current waveform signal of each half-cycle is formed by a current waveform pattern half-cycle and a stretch factor. While the current waveform pattern half-cycle is stretched or compressed in a temporal direction by the synchronization, the stretch factor serves to adapt the amplitude of the current waveform signal. One very simple embodiment of the invention therefore provides for the current waveform signal of each half-cycle to be formed by a multiplication of the stretch factor by the current waveform pattern half-cycle. In modified embodiments, a full wave or a multiple of the half-cycle can also be used instead of a half-cycle as the current waveform pattern. The current waveform signal can be calculated in a very simple manner in this configuration.

In one preferred embodiment of the invention, during the operation of the electrical supply apparatus, the current waveform pattern half-cycle, for each half-cycle, is designed to be identical or identical at least for more than 70%, preferably more than 800, of the temporal profile. In particular, and as will be explained later, alterations can be provided in the start and end regions of the current waveform pattern half-cycle. In one very general embodiment, the current waveform pattern half-cycle is constant; in modified embodiments, the current waveform pattern half-cycle is only quasi-constant, that is to say that it can change during operation on account of changed operating parameters, etc. The current waveform pattern half-cycle is identical for example for at least 50 successive, preferably 100 successive, half-cycles of the current waveform signal. It is also possible for a plurality of current waveform pattern half-cycles to be available, which are employed alternately or in a manner depending on requirements.

The curve shape of the current waveform pattern half-cycle is preferably calculated or stored. In particular, the current waveform pattern half-cycle can be stored in a look-up table or as a data set. Alternatively, the current waveform pattern half-cycle can be calculated e.g. by means of a simple function.

One development of the invention provides for the control module to have a supervisory device, which provides a difference parameter in a manner depending on the difference between the output voltage Uout and a predefinable reference voltage Uref. The reference voltage is the desired voltage of the output voltage. If, for example, a plurality of loads are simultaneously connected to the electrical supply apparatus, then the output voltage Uout can fall and deviate from the desired output voltage. This difference between output voltage Uout and reference voltage Uref is provided as a difference parameter and the stretch factor is formed in a manner depending on the difference parameter. As considered in practice, in the event of a plurality of loads being switched on, the output voltage Uout will fall, with the result that the supply current has to be increased. This is done by increasing the stretch factor for the current waveform signal. The manner of tracking the output voltage to the desired output voltage can be effected by means of arbitrary controllers, e.g. PI or PID controllers, in the most general embodiment of the invention.

As already explained in the introduction, however, the highly dynamic tracking of the supply current within a half-cycle can lead to a deformation of the curve shape of the input current Ipfc and thus to an impediment of the power factor. Although this effect is already attenuated by the use of the current waveform pattern half-cycle, it is preferred for the stretch factor to be kept constant over a half-cycle. This measure ensures that the curve shape of the current waveform wave corresponds to the if appropriate stretched or compressed curve shape of the current waveform pattern half-cycle and is thereby adapted to the curve shape of the input voltage Uin or rectified input voltage Upfc, such that a high power factor of almost 1 can be achieved. Keeping the stretch factor constant over a half-cycle can be realized technically by means of a so-called sample-and-hold element, for example.

In one possible development of the invention, the control module has a phase shifter device, which enables a phase shift of the current waveform signal and thus of the input current Ipfc relative to the input voltage Uin or the rectified input voltage Upfc. Further possibilities for adapting the electrical supply apparatus are opened up by the control of the phase angle between input current Ipfc and input voltage Uin or rectified input voltage Upfc.

In this regard, it is possible, for example, for the phase shift to be set so as to correct or compensate for reactive currents in the electrical supply apparatus, caused by reactive current generators. Reactive currents are caused, in particular, by capacitive or inductive loads and lead to an impediment of the power factor. In particular, these measures result in power factors of greater than 0.98, specifically greater than 0.99.

In one possible configuration of the invention, the electrical supply apparatus comprises an RF filter having a capacitive effect, which filter leads to a capacitive shift in the input current relative to the input voltage. Such RF filters often have a capacitance in order to damp higher frequencies. In order to correct or compensate for the effect of the reactive currents caused by the capacitance, the input current Ipfc is shifted in the opposite direction, considered temporally, by the phase shifter device. This measure can successfully compensate even for effects which are generated by the RF filter connected upstream.

In one possible embodiment of the invention, the phase shift is designed as a constant or quasi-constant parameter during operation. Since the components in the electrical supply apparatus are known in the design and conception of the electrical supply apparatus, a reactive current of the reactive current generator, in particular of the RF filter connected upstream, can be estimated, calculated or measured beforehand and the resultant required or expedient phase shift for the input current can be set as a constant or quasi-constant parameter. This embodiment is distinguished by a high robustness and a simple configuration.

In another embodiment of the invention, the phase shift is configured as a variable, in particular load-dependent, parameter. This configuration takes account of the fact that the influence of the reactive currents varies depending on the load of the consumers present and load-dependently different phase shifts are thus necessary for optimum compensation or correction. In this regard, in the case of a full load, for example, the reactive current is less significant, and so the compensating phase shift can turn out to be relatively small. By contrast, the reactive current has a significantly greater effect in the case of a partial load, and so the phase shift for compensating for the reactive current must also turn out to be greater.

In one advantageous development of the invention, the current waveform pattern half-cycle is set to zero in at least one marginal region for at least the time duration corresponding to the phase shift. This development is based on the consideration that, on account of the phase shift between input current for the PFC module and input voltage or rectified input voltage, undesirable current spikes at the system current can occur upon zero crossings of the input voltage.

In one possible embodiment of the invention, a rectified input voltage half-cycle and a half-cycle of the input current are shifted by a phase shift with respect to one another, the current waveform pattern half-cycle is set to zero in the marginal region, such that the input current Ipfc is set to zero in the time range between the zero crossing of the rectified input voltage half-cycle and the unmodified current waveform signal. This measure largely suppresses current spikes in the system current in a manner temporally corresponding to that region of the current waveform pattern half-cycle, of the current waveform signal or of the input current which is set to zero.

Although such current spikes only slightly influence or do not influence the power factor, the suppression of the current spikes is nevertheless expedient since this measure significantly improves the curve shape of the system current, which is likewise a quality factor for an electrical supply apparatus.

Further subject matter relates to a method for operating the electrical supply apparatus as described above or according to any of the preceding claims. Preferably, the method comprises a reconfiguration of the electrical supply apparatus, wherein the current waveform pattern half-cycle, the stretch parameter and/or the reference voltage are/is changed by software technology.

Further features, advantages and effects of the invention are evident from the following description of a preferred exemplary embodiment of the invention and the accompanying figures, in which:

FIG. 1 shows a schematic block illustration of a power supply unit as an exemplary embodiment of the invention;

FIGS. 2a to e show various graphs of curve shapes;

Figure 1:
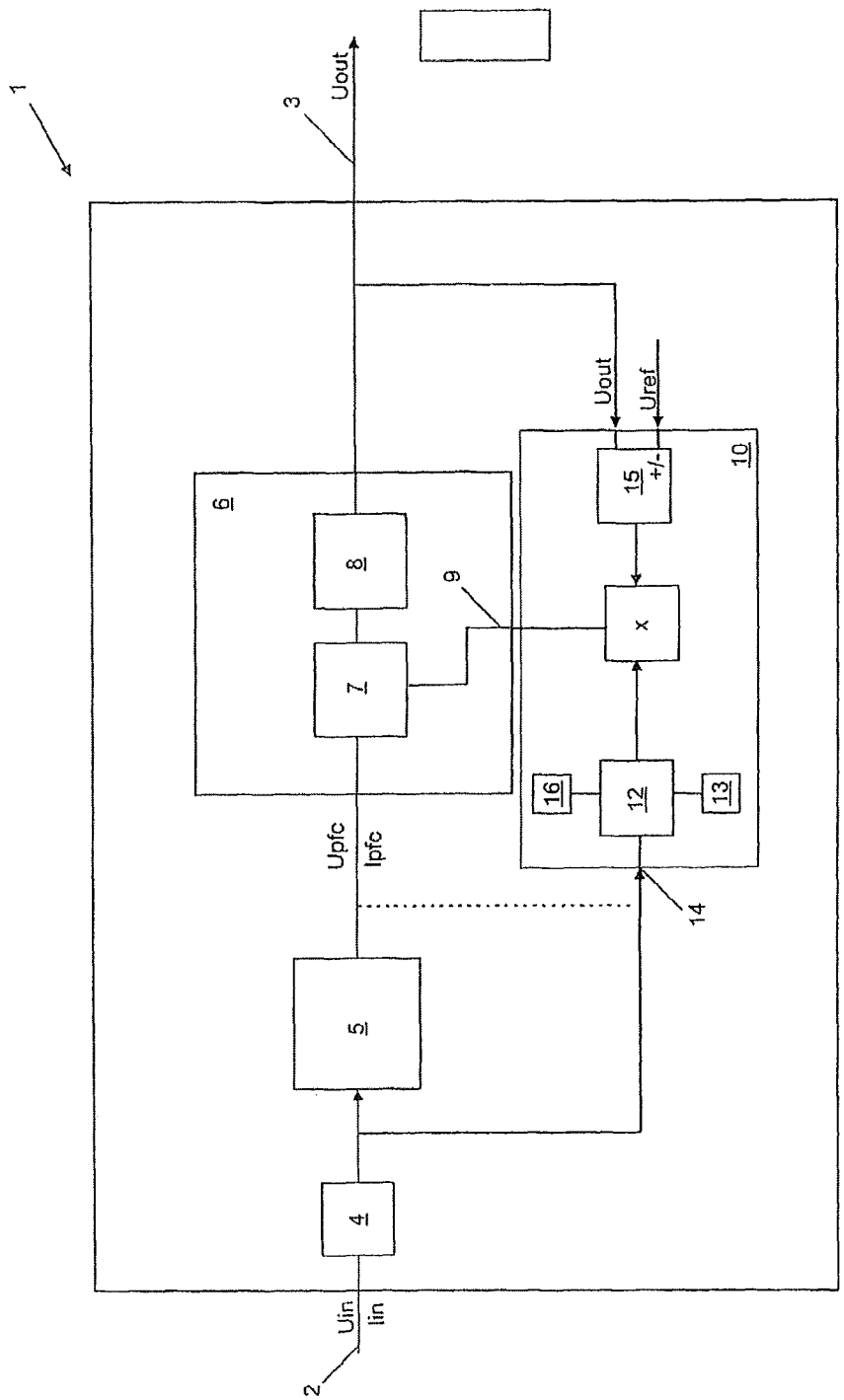

FIG. 1 shows a schematic block illustration of a power supply unit 1, for example for a lighting system of an aircraft, as an exemplary embodiment of the invention, which forms an electrical supply apparatus. The power supply unit 1 has a power of between 20 watts and 200 watts, and in the aircraft serves for supplying lighting devices (not illustrated), in particular LED lighting devices, for aircraft interior lighting.

The power supply unit 1 comprises an input 2, by which the power supply unit 1 can be connected to the supply system of the aircraft. The supply system provides an input voltage and a system current. The input voltage is designed as a sinusoidal AC voltage and has a frequency of between 400 hertz and 800 hertz and a route-mean-square input voltage of 115 V.

The power supply unit 1 comprises an output 3, which is connectable or connected to the loads, in particular the lighting devices in the aircraft. The output voltage is a DC voltage of, for example, between 200 volts and 250 volts.

Proceeding from the input 2, an RF filter 4 is arranged downstream, said filter being designed for filtering high frequencies. In one concrete configuration, the RF filter 4 can have at least one capacitor. In particular, the RF filter 4 is designed as a system filter.

A rectifier 5 is arranged downstream of the RF filter 4, said rectifier converting the input voltage into a rectified input voltage. By way of example, the rectifier 5 is designed as a bridge rectifier or full-wave rectifier. The rectified input voltage is a pulsating DC voltage, wherein—as considered graphically—portions of the input voltage which progress in the negative voltage range are played about the x-axis. The pulsating, rectified input voltage thus has double the frequency of the input voltage. The current flowing in this range is designated as the input current.

The rectified input voltage is subsequently directed into a PFC module 6 having a power factor correction device 7 and a smoothing device 8.

The smoothing device 8 serves to convert the pulsating rectified input voltage into the output voltage having a constant voltage level. The smoothing device 8 can be represented as a capacitor in the context of an equivalent circuit diagram.

The power factor correction device 7 serves to match the input current into the PFC module 6 to the rectified input voltage. In this case, the matching is effected in order to improve the power factor in the region of the power supply system, that is to say in the region of the input 2. The power factor correction device 7 makes this possible by modulating the supply current fed to the smoothing device 8 in such a way that the input current into the PFC module 6 is matched to a predefined current waveform signal 9. The current waveform signal 9 is generated in a control module 10, as will be explained below.

Figure 2:
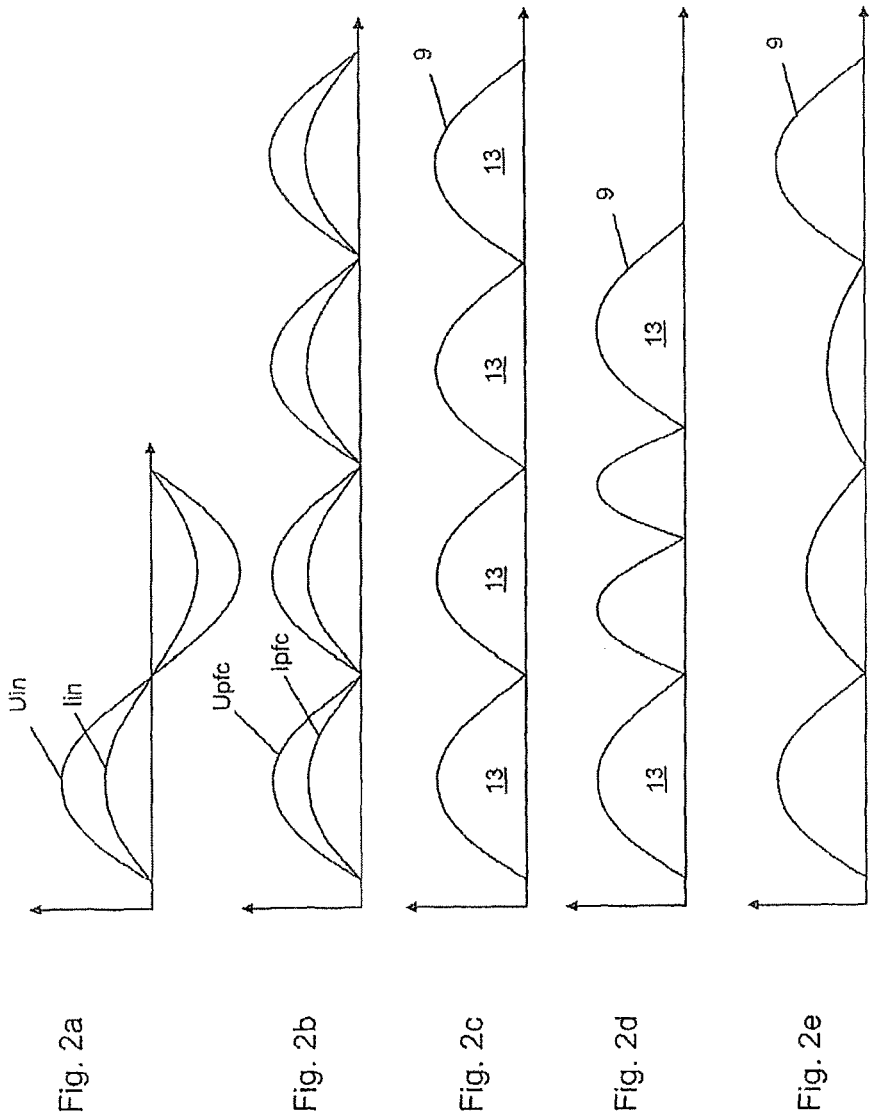

FIG. 2a shows in each case a full wave of the system current Iin and of the input voltage Uin into the power supply unit 1. Both curves are sinusoidal and have a phase angle with respect to one another of 0 degrees, that is to say that they are in phase. This state is the optimum with regard to the power factor, such that here a power factor of 1 is present.

In order to achieve this ideal state, in the region downstream of the rectifier 5 and upstream of the PFC module 6 the rectified input voltage Upfc and the input current Ipfc into the PFC module 6 must likewise have a fixed phase angle with respect to one another. FIG. 2b illustrates the rectified input voltage Upfc and the input current Ipfc, wherein here, however, a phase angle of 0 degrees, that is to say once again an in-phase behavior, is illustrated.

In order to obtain the input current Ipfc as shown by way of example in FIG. 2b, the current waveform signal 9 must therefore likewise be composed of a multiplicity of sinusoidal half-cycles. The curve profile of an exemplary current waveform signal 9 is illustrated in FIG. 2c.

In order to generate the current waveform signal 9, the control module 10 has a signal generator 12, which generates the current waveform signal 9 on the basis of a stored or calculated current waveform pattern half-cycle 13. FIG. 2c shows in succession four repetitions of the current waveform pattern half-cycle 13.

With the aim of achieving the phase angle between the input voltage Uin or the rectified input voltage Upfc and the current waveform signal 9 and thus the input current Ipfc, the control module 10 has a synchronization input 14 (FIG. 1), into which a synchronization signal of the input voltage Uin or of the rectified input voltage Upfc is led. Since fluctuations with regard to frequency can indeed also occur in supply systems, the control module 10 is designed such that it can stretch or compress the current pattern half-cycle 13 in a temporal direction. This situation is illustrated schematically in FIG. 2d, wherein the first half-cycle corresponds to the unchanged current pattern half-cycle 13, but the following two half-cycles are compressed in a temporal direction.

Furthermore, the control module 10 comprises a supervisory device 15 (FIG. 1), which compares the output voltage Uout with a reference voltage Uref in order to be able to regulate the current flow into the smoothing device 8. By way of example, if many loads are connected to the output 3 or activated, then the output voltage Uout will fall and has to be compensated for by an increased supply current into the smoothing device 8. The supervisory device 15 compares the output voltage Uout with the reference voltage Uref and forms a difference parameter. A stretch factor is derived from the difference parameter and multiplied by the current pattern half-cycle 13. The stretch factor can be between 0 and 1, for example, depending on the normalization.

The effect of the stretch factor is illustrated in FIG. 2e, wherein the first half-cycle has a stretch factor of 1, the second half-cycle has a stretch factor of 0.7, the third half-cycle has a stretch factor of 0.3 and the fourth half-cycle has a stretch factor of 1.

During operation, the current waveform signal 9 is shaped both by the adaptation of the current waveform pattern half-cycle 13 by the temporal synchronization and by the stretch factor.

It should be emphasized that the curve shape of the current waveform signal 9 is independent of the present curve shape of the input voltage Uin or the rectified input voltage Upfc. In this regard, it may indeed by the case that the input voltage Uin or the rectified input voltage Upfc is deformed, but this has no influence on the curve shape of the current waveform signal 9, since said curve shape is formed by the current waveform pattern half-cycle 13.

In conventional power factor corrections, the question of the dynamic range of the tracking of the output voltage is always left unresolved. If the dynamic range is chosen to be very high, the power factor correction can react very rapidly to sudden load changes of the loads. However, this high dynamic range has the disadvantage that upon the falling edge of the input current Ipfc, the output voltage Uout likewise falls somewhat, such that system-inherently a fast controller will attempt to increase the supply current and thus the input current Ipfc in the temporal range of the next rising edge of the half-cycle. In conventional systems, however, this inevitably has the effect that the curve shape of the input current Ipfc and thus the curve shape of the system current Iin deviates from a sine and is distorted or deformed.

By contrast, in the case of the power supply unit 1, the stretch factor is kept constant over the time duration of a half-cycle. Changes on account of the difference parameter are thus taken into account only at the beginning of a new half-cycle. This procedure has the advantage that the dynamic range of the power supply unit 1 is very high since the stretch parameter can be changed abruptly from one half-cycle to the next half-cycle, but the curve shape is not adversely influenced by this high dynamic range, since the current pattern half-cycle 13 is not distorted as a result of the constant stretch factor.

The control module 10 furthermore has a phase shifter device 16, which enables a phase shift of the current waveform signal 9 relative to the input voltage Uin. The phase shifter device 16 thus makes it possible to vary or set the phase angle between the rectified input voltage Upfc or the input voltage Uin, on the one hand, and the input current Ipfc and thus also the phase angle between the input voltage Uin and the system current Uin.

A phase shift between input current Ipfc and rectified input voltage Upfc can be used, for example, to correct or compensate for a capacitive phase shift between input voltage Uin and system current Iin, said capacitive phase shift being caused by a capacitance in the RF filter 4. The capacitance usually present in the RF filter 4 gives rise to a so-called reactive current, the phase angle of which is shifted by 90 degrees with respect to the active current of the system current Iin. This reactive current leads to a reduction of the power factor. The phase shifter device 16 makes it possible, then, to shift the input current Iin with regard to the phase angle in such a way that the effects of the reactive current on the power factor are as small as possible. Instead of the reactive current caused by the capacitance in the RF filter 4, any other reactive current caused by a capacitance or an inductance in the power supply unit can be compensated for or corrected in the same way.

In one simple embodiment of the power supply unit 1, the phase shifter device 16 can implement a constant phase shift since the magnitude of the capacitance in the RF filter 4 or other reactive current generators is already known upon the start-up of the power supply unit 1 and an optimum value for compensation for the phase shift can be found for a specific load state of the power supply unit 1. A further potential for improvement can be developed if the phase shift is carried out in a load-dependent manner since the reactive current in the entire system current Iin is proportionally greater in the case of a lower load than in the case of full load. Accordingly, a phase shift that has to be implemented for compensation or correction is greater in the case of a partial load than in the case of the full load.

Figure 3:
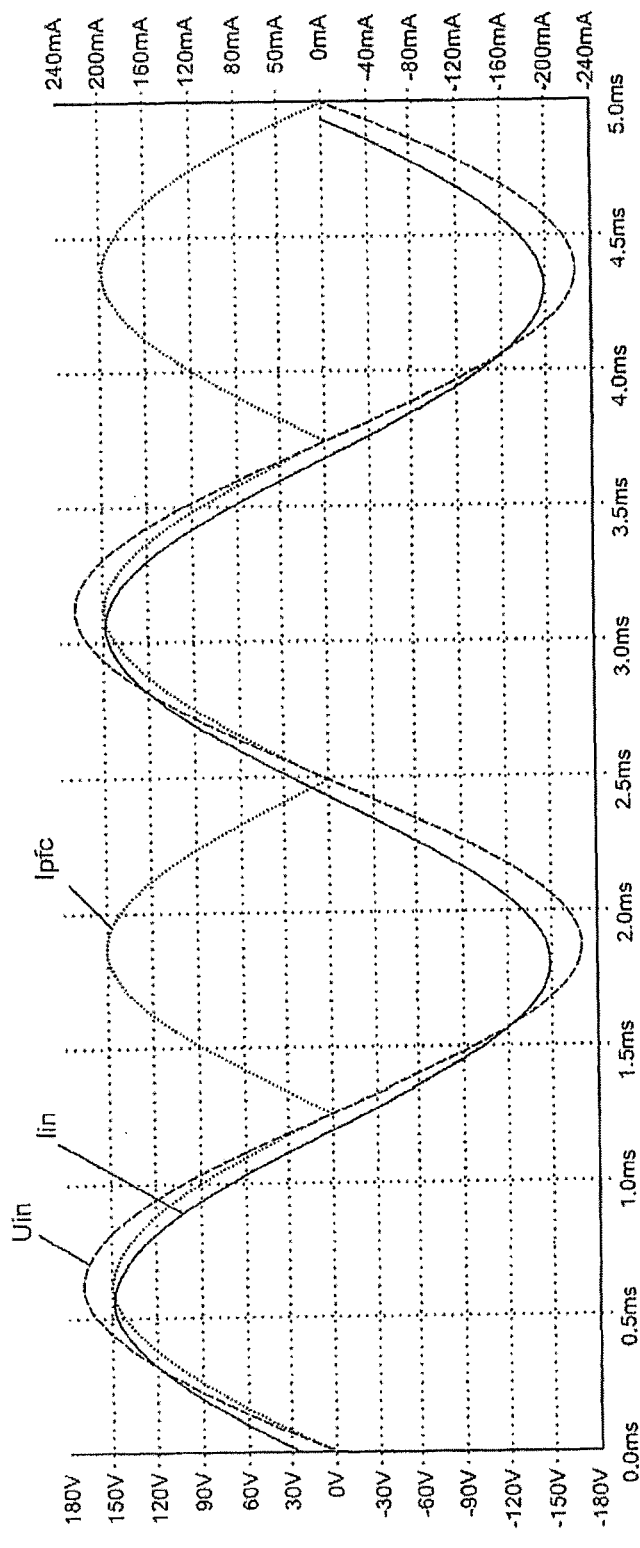
FIG. 3 shows current and voltage signals of the power supply unit in FIG. 1.

FIG. 3 shows a schematic illustration of the curve profile of the input voltage Uin, of the system current Iin and of the input current Ipfc. In this illustration, input voltage Uin and input current Ipfc are in phase, that is to say that the phase shift is equal to zero. On account of the capacitive effect of the RF filter 4, however, the phase angle of the system current Iin is slightly shifted in the negative time direction. Since the power factor is calculated taking account of the input voltage Uin and the system current Iin, FIG. 3 shows a non-optimized behavior of the power supply unit 1.

Figure 4:
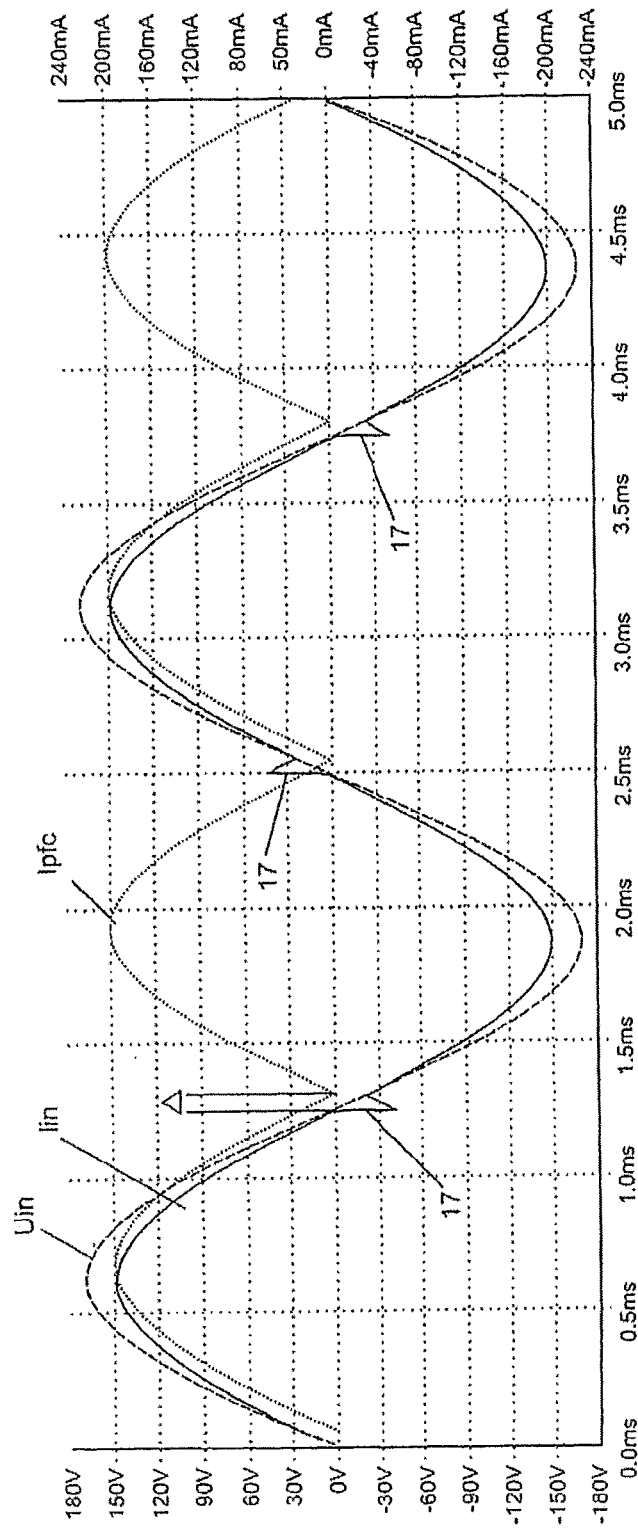
FIG. 4 shows the same current and voltage signals as in FIG. 3, but with a phase shift.

In FIG. 4, by contrast, a phase shift $\Delta$ between input voltage Uin and input current Ipfc is introduced by the phase shifter device 16, such that system current Iin and input voltage Uin now progress in phase and implement a high power factor.

Figure 5:
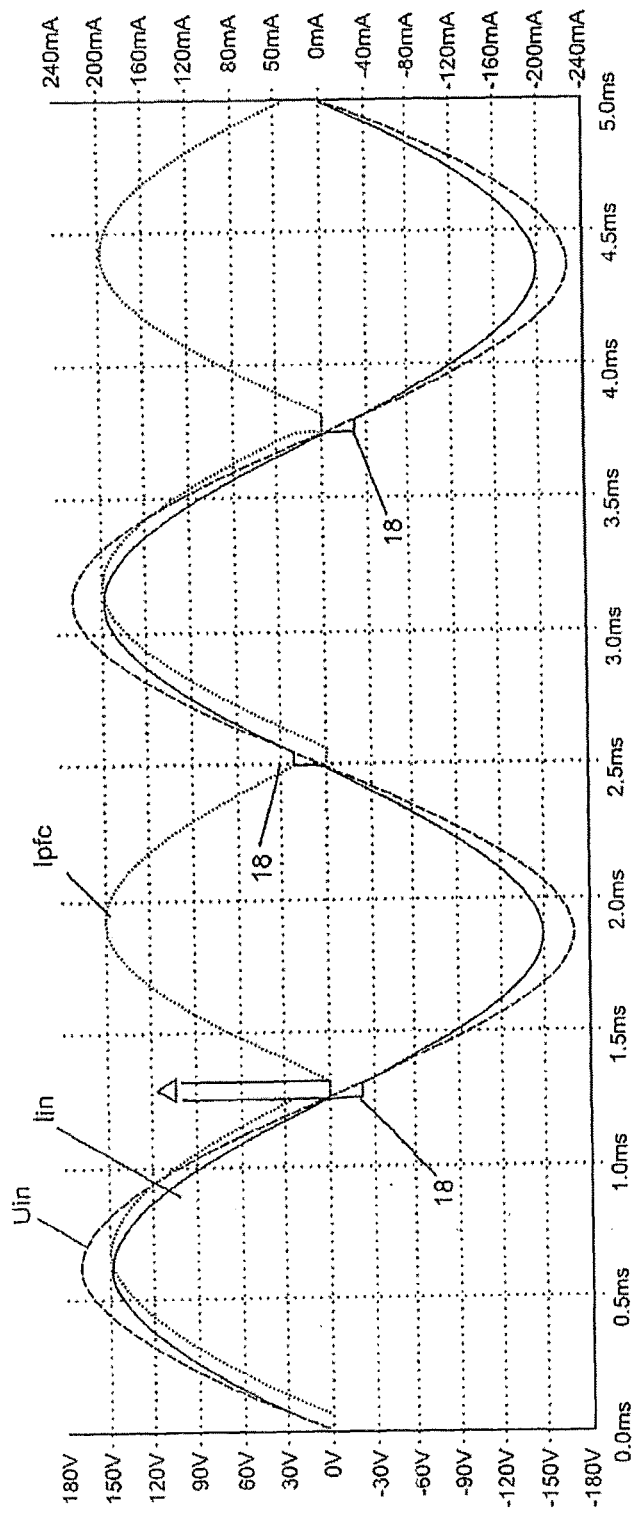
FIG. 5 shows the same illustration as FIG. 4, but with a zero point zeroing.

However, on account of the rectifier 5, jags 17 arise in the curve profile of the system current Iin. Since the jags 17 are relatively small in terms of absolute value, they hardly reduce the power factor. However, the curve shape of the system current Iin is disturbed, which is likewise undesirable. For this reason, the control module 10 implements zero point zeroing, as is shown in FIG. 5.

The current waveform signal 9 is set to zero for the time duration of the phase shift $\Delta$ in each case after the crossing of the input voltage signal through zero for the time of the phase shift $\Delta$, such that the input current Ipfc is also set to zero. The effect of this zero point zeroing can again be discerned in the system current Iin. Instead of the jags 17, significantly smaller steps 18 can now be discerned, which restrict the quality of the curve profile to a lesser extent.

LIST OF REFERENCE SIGNS

1 Power supply unit
2 Input
3 Output
4 RF filter
5 Rectifier
6 PFC module
7 Power factor correction device
8 Smoothing device
9 Current waveform signal
10 Control module
11 Blank
12 Signal generator
13 Current waveform pattern half-cycle
14 Synchronization input
15 Supervisory device
16 Phase shifting device
17 Jags
18 Steps

The invention claimed is:
1. An electrical supply apparatus, comprising:
an input for connecting the electrical supply apparatus to a power supply system which provides an AC voltage as input voltage,
an output for connecting the electrical supply apparatus to a load, wherein the output provides a DC voltage as output voltage,
a rectifier, which rectifies the input voltage into a rectified input voltage,
a PFC module comprising: a smoothing device for smoothing the rectified input voltage; and an active power factor correction device, wherein the power factor correction device is configured to shape, depending on a time-dependent current waveform signal, a time-dependent supply current for the smoothing device in such a way that a time-dependent input current into the PFC module is matched to the current waveform signal,
a control module, which generates the current waveform signal for the PFC module,
wherein the control module generates the curve shape of the current waveform signal during the operation of the electrical supply apparatus independently of the input voltage and temporally synchronizes the current waveform signal with the input voltage or a derivative of the input voltage,
a phase shifter device for enabling a phase shift of the current waveform signal,
wherein a current waveform pattern half-cycle of the current waveform signal is set to zero in at least one marginal region for at least the time duration that corresponds to the phase shift, and
wherein when a phase shift occurs, the current waveform pattern half-cycle is set to zero in the at least one marginal region, such that the input current is set to zero for the time period between the zero crossing of the input voltage and the zero crossing of an unchanged current waveform signal.
2. The electrical supply apparatus as claimed in claim 1, wherein the current waveform signal is subdivided into half-cycles, wherein the current waveform signal of each half-cycle is formed by a current waveform pattern half-cycle and a stretch factor.
3. The electrical supply apparatus as claimed in claim 2, wherein the current waveform pattern half-cycle, for each half-cycle, is configured to be identical or identical at least for more than 70% of the temporal profile.
4. The electrical supply apparatus as claimed in claim 2, wherein the current waveform pattern half-cycle is stored as a data set or is present as a function in the control module.
5. The electrical supply apparatus as claimed in claim 2, wherein the control module has a supervisory device, which provides a difference parameter in a manner depending on the difference between the output voltage and a reference voltage, wherein the stretch factor is formed in a manner depending on the difference parameter.
6. The electrical supply apparatus as claimed in claim 5, wherein the stretch factor is kept constant over a half-cycle.
7. The electrical supply apparatus as claimed in claim 2, wherein the current waveform pattern half-cycle, for each half-cycle, is configured to be identical or identical at least for more than 80% of the temporal profile.
8. The electrical supply apparatus as claimed in claim 1, wherein the phase shift is set so as to correct or compensate for reactive currents in the electrical supply apparatus caused by reactive current generators.
9. The electrical supply apparatus as claimed in claim 8, wherein reactive currents from an RF filter connected upstream and having a capacitive effect are corrected or compensated for.
10. The electrical supply apparatus as claimed in claim 1, wherein the phase shift is configured as a constant or quasi-constant parameter during operation.
11. The electrical supply apparatus as claimed in claim 1, wherein the phase shift is configured as a variable parameter.
12. The electrical supply apparatus as claimed in claim 11, wherein the phase shift is configured as a load-dependent parameter.
13. A method for operating an electrical supply apparatus, wherein the electrical supply apparatus comprises:
an input for connecting the electrical supply apparatus to a power supply system which provides an AC voltage as input voltage,
an output for connecting the electrical supply apparatus to a load, wherein the output provides a DC voltage as output voltage,
a rectifier, which rectifies the input voltage into a rectified input voltage,
a PFC module comprising: a smoothing device for smoothing the rectified input voltage; and an active power factor correction device, wherein the power factor correction device is configured to shape, depending on a time-dependent current waveform signal, a time-dependent supply current for the smoothing device in such a way that the time-dependent input current into the PFC module is matched to the current waveform signal,
a control module, which generates the current waveform signal for the PFC module, wherein the control module generates the curve shape of the current waveform signal during the operation of the electrical supply apparatus independently of the input voltage and temporally synchronizes the current waveform signal with the input voltage or a derivative of the input voltage,
a phase shifter device for enabling a phase shift of the current waveform signal,
wherein a current waveform pattern half-cycle of the current waveform signal is set to zero in at least one mar- ginal region for at least the time duration that corresponds to the phase shift, and wherein when a phase shift occurs, the current waveform pattern half-cycle is set to zero in the at least one marginal region, such that the input current is set to zero for the time period between the zero crossing of the input voltage and the zero crossing of an unchanged current waveform signal.

14. The method as claimed in claim 13, wherein the electrical supply apparatus is reconfigured by the current pattern half-cycle being changed.

* * * * *